United States Patent
Home

(10) Patent No.: US 6,513,373 B1
(45) Date of Patent: Feb. 4, 2003

(54) SUSPENSION SUPPORT WITH VOLUME INDICATION FOR A LPG TANK

(75) Inventor: William Home, Taipei (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/023,664

(22) Filed: Dec. 21, 2001

(51) Int. Cl.⁷ .......................... G01F 17/00; G01F 23/00; G01F 23/20
(52) U.S. Cl. .......................... 73/149; 73/296; 73/290 R
(58) Field of Search .................. 73/290 R, 296, 73/32 R, 433, 435, 436, 149

*Primary Examiner*—Hezron Williams
*Assistant Examiner*—Rodney Frank
(74) *Attorney, Agent, or Firm*—Rosenberg, Klein & Lee

(57) ABSTRACT

A suspension support with volume indication for a LPG tank comprising a slidable upright pole, a securing rail having an opening as a sliding path, a retractable restoring device, a plurality of suspension hooks and a measuring device with a display capable of showing level indication is disclosed. The suspension support is characterized in that the securing rail is mounted at one end of the slidable upright pole and the restoring device connected the securing rail with the slidable upright pole at one end within the sliding path, the sensing section of the measuring device is mounted between the slidable upright pole and the sliding path, remote away from the restoring device, such that the sensing section produces a triggering action due to the weight between the securing rail and the slidable upright pole, and signal of level number is transmitted to the display of the measuring device to provide an indication, and the suspension hooks are mounted to one end face of the slidable upright pole to suspend at a lug on the LPG tank and the bottom of the LPG tank.

13 Claims, 4 Drawing Sheets

SUSPENSION SUPPORT WITH VOLUME INDICATION FOR A LPG TANK

BACKGROUND OF THE INVENTION (a) Field of the Invention

The present invention relates to a LPG suspension support, and in particular, a support, which can indicate the amount of the liquefied petroleum gas (LPG) with a LPG tank, suspended on the suspension support.

(b) Description of the Prior Art

The amount of LPG in a LPG tank is normally unknown to users after LPG has been used in cooking or the like for a period of time. Occasionally, LPG is insufficient in the middle of preparing a meal. In order to avoid such a shortage of LPG, some users have to get a spare tank of LPG but the tank occupies some space within the kitchen. In view of the above, it is important that the exact amount of LPG within the tank can be read or estimated so that the users can get a spare tank earlier before the tank is totally empty to avoid shortage of LPG in the middle of preparing a meal.

SUMMARY OF THE INVENTION

Accordingly, it is an object of the present invention to provide a suspension support with volume indication for a LPG tang wherein the amount of LPG in a LPG tank will be shown allowing the user to get ready for a new tank of LPG.

Yet a further object of the present invention is to provide a suspension support with volume indication for a LPG tank wherein the LPG tank is suspended to the support, and the amount of LPG in the tank is clearly shown without moving the LPG tank to proceed to measurement.

An aspect of the present invention is to provide a suspension support with volume indication for a LPG tank comprising a slidable upright pole, a securing rail having an opening as a sliding path, a retractable restoring device, a plurality of suspension hooks and a measuring device with a display capable of showing level indication, characterized in that the securing rail is mounted at one end of the slidable upright pole and the restoring device connected the securing rail with the slidable upright pole at one end within the sliding path, the sensing section of the measuring device is mounted between the slidable upright pole and the sliding path, remote away from the restoring device, such that the sensing section produces a triggering action due to the weight between the securing rail and the slidable upright pole, and signal of level number is transmitted to the display of the measuring device to provide an indication, and the suspension hooks are mounted to one end face of the slidable upright pole to suspend at a lug on the LPG tank and the bottom of the LPG tank.

Other object and advantages of the present invention will become more apparent from the following description taken in conjunction with the accompanying drawing.

DETAILED DESCRIPTION OF THE PRESENT INVENTION

Figure 1:
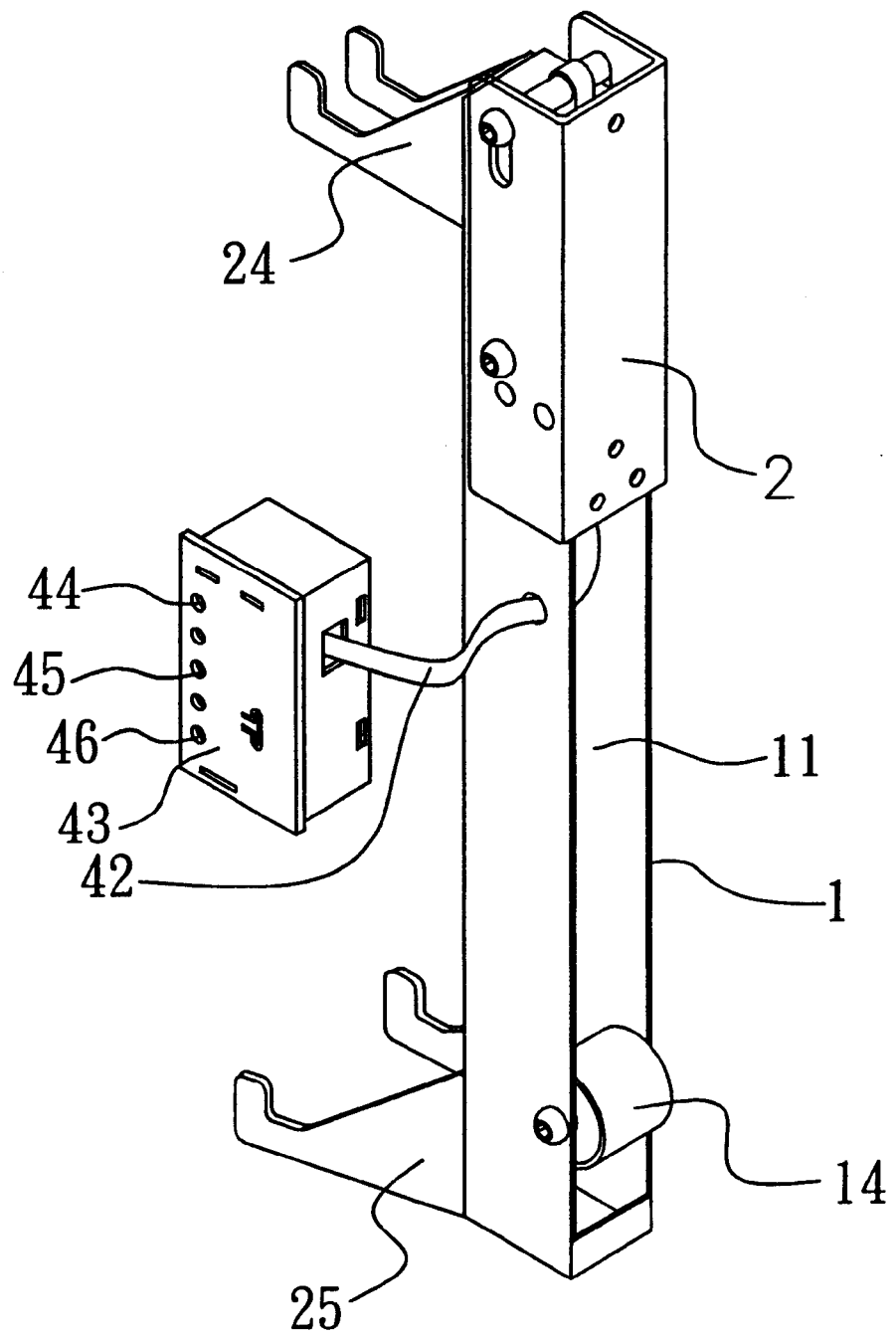
FIG. 1 is a perspective view of a suspension support with volume indication for LPG in accordance with the present invention.
Figure 2:
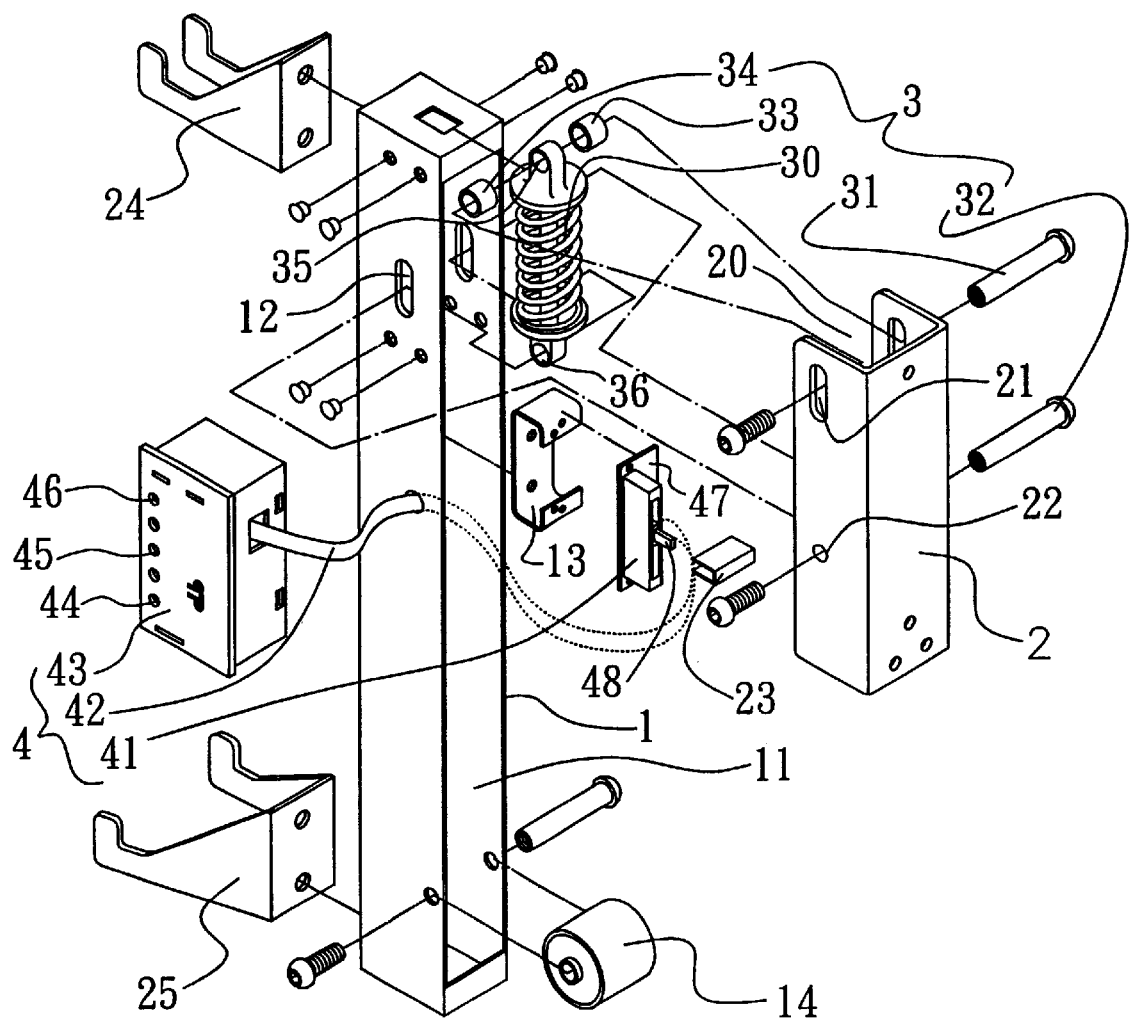
FIG. 2 is a perspective exploded view of a suspension support with volume indication for LPG in accordance with the present invention.

Referring to FIGS. 1 and 2, there is shown a suspension support with volume indication for a LPG tank comprising a slidable upright pole 1, a securing rail 2 having an opening at one side as a sliding path 20, a retractable restoring device 3, and a measuring device 4 which displays an liquid inication of level. The other side of the securing rail 2, opposite to the sliding path 20, is mounted by fastener or welding to the lateral side of an oven so that the opened sliding path 20 can mount onto one end of the slidable upright pole 1, and one side of the slidable upright pole 1 is a cavity 11. A retractable restoring device 3 is mounted within the cavity 11, forming an elastic connection between the slidable upright pole 1 and the securing rail 2. The restoring device 3 is an elastic body 30, which is formed from a plurality of spring coils, or a spring absorber together with a plurality of positioning pegs 31, 32, or sleeves 33, 34. The spring body is provided with an appropriate elastic strength to sense the volume of the amount of LPG in the LPG tank, and the change of spring force at the slidable upright pole 1. At the two lateral side walls of the securing rail 2, corresponding to the upper end lug 35 of the elastic body, a corresponding first pair of long slots 21 are provided, and the two lateral wall of the slidable upright pole 1 corresponding to the lower end lug 36 of elastic body 30, a second pair of long slots are provided via a pair of fixing hole 22 at the second long slot 12, and the long slots 21, 12, the fixing hole 22 are slightly larger than the peg body of the peg 31, 32 at the end portion but smaller than the pegs 31, 32 end portion. Such peg 31 at one end passes through the upper end lug 35, and the sleeves 33, 34, and the first long slot 21 for locking, and at the other end, the peg 32 passes through the fixing hole 22, the lower end lug 36, and the locking of the second pair of the long slot 12, forming the connection in series with the slidable upright pole 1 and the fixing rail 2.

As shown in the figure, the measuring device 4 includes a sensing section 41, at least a transmission wire 42 and a display 43. The sensing section 41 is a direct-dialing multi-stage switch or direct-dialing variable resistance connected with a plurality of wires forming into the transmission wire 42 and passing through the slidable upright pole 1, connecting to the display 43 having a plurality of indicators 44, 45, 46. The sensing section 41 has the interior filled with elastic oil sacs and a transmission wire 42 is connected to a pressure conduit passing through the slidable upright pole 1 and connecting to the display 43 forming the pressure gauze. The display 43 can be adhered or screwed to an appropriate position of the oven panel.

The sensing section 41 of the measuring device 4 is located between the cavity 11 and the sliding path 20, away from the retraction restoring device 30, and wit the cavity 11 and the sliding path 20, engaging fasteners 13, 23 are provided. These fasteners 13, 23 are used to mount the fixing end 47 of the sensing section 41 and the triggering end 48 so as to connect the slidable upright pole 1 to the securing rail 2. The other face of the pole 1, a plurality of suspension hooks 24, 25 are provided to suspend tile lug of the LPG tank, the tank bottom. The other end of the cavity, a wheel 14 is provided allowing the rolling along the lateral wall of the oven.

Figure 3:
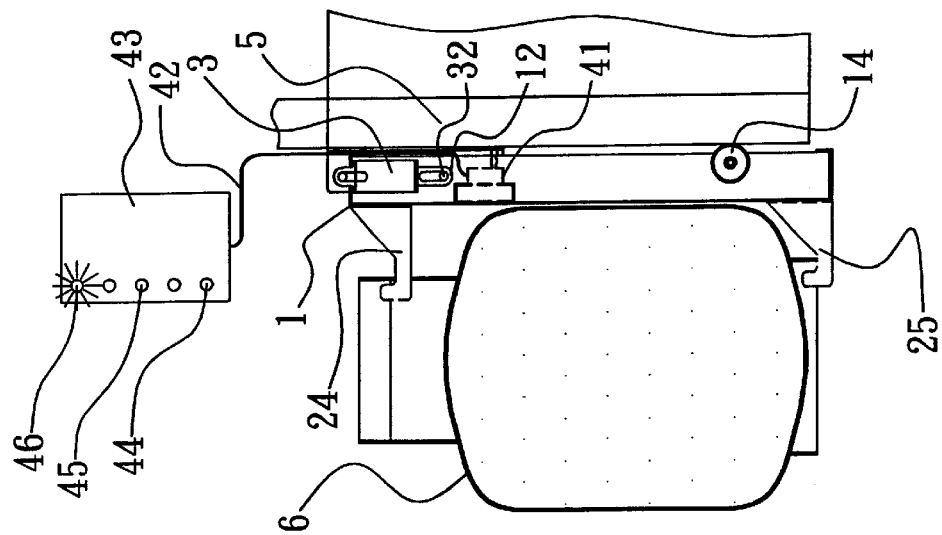
FIGS. 3 to 5 are schematic sectional views showing the action of the suspension support with volume indication for LPG in accordance with the present invention.
Figure 4:
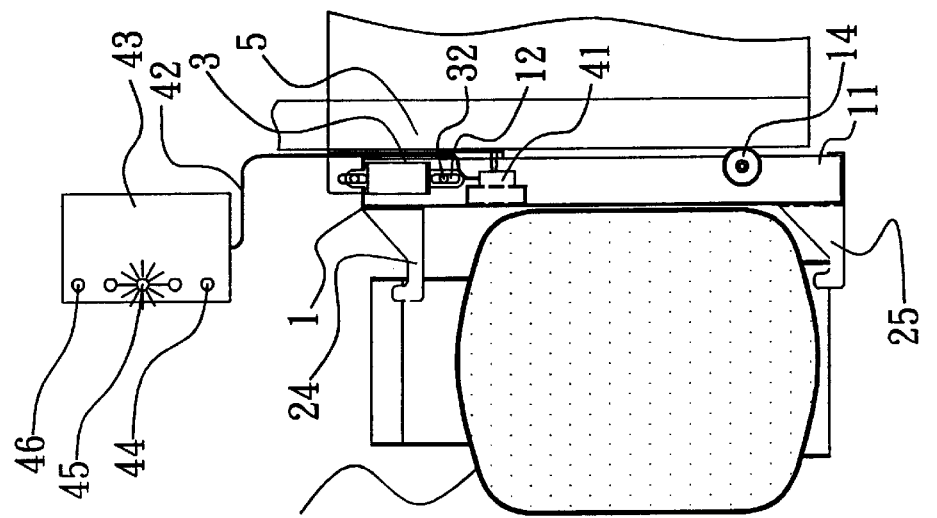
Figure 5:
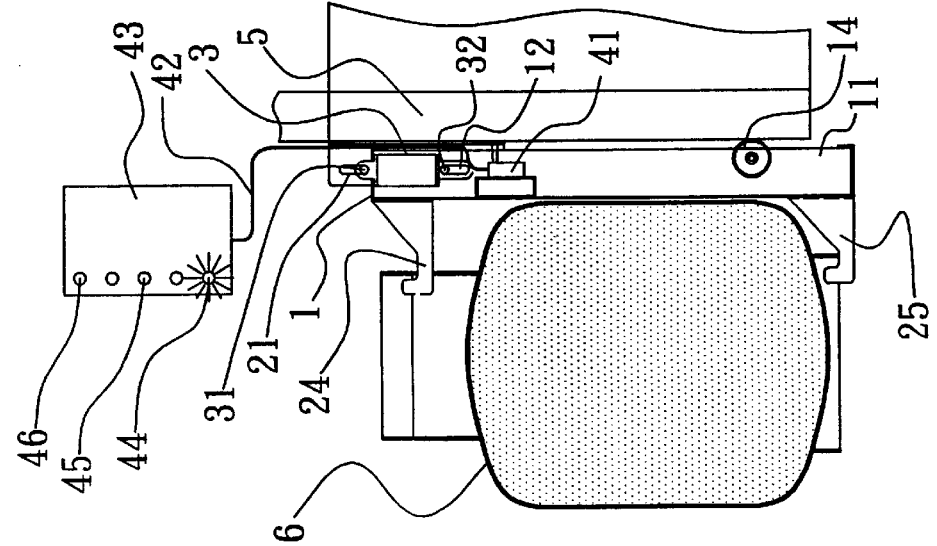

Referring to FIGS. 3, 4 and 5, the support is located at the lateral wall 5 of the oven. In everyday use, the LPG tank 6 is suspended at the suspension support for utilization. The suspension hooks 24, 25 hold the total weight of the LPG tank 6 and the slidable upright pole is pulled downward and the retractable restoring device 3 is compressed by the top end of the slidable upright pole 1, producing the amount of retraction corresponding to the pulling weight, and the peg 31 is pulled and slides along the first pair of the long slot 21, and the second pair of the long slot 12 moves upward along the peg 31. As such, the slidable upright pole 1 will provide a downward movement as a result of the total weight of the LPG tank 6, and trigger the sensing section 41. The corresponding band number is indicated on the display 43. Thus, when the LPG tank 6 contains LPG, as shown in FIG. 3, the slidable upright pole 1 moves downward to a maximum and the indicator 44 of the display 43 showing maximum LPG is lighted. As shown in FIG. 4, when the LPG in the LPG tank 6 is only half a tank, the total weight of the tank 6 is lighter and the slidable upright pole 1 is retracted by the restoring device 3 to a distance, the indicator 45 of the display 43 indicating that the LPG tank is half full is lighted. As shown in FIG. 5, when the LPG in the LPG tank 6 is almost empty, the total weight of the LPG tank 6 is the lightest, and the slidable upright pole 1is restored fully to the top position and the indicator 46 of the display 43 is lighted. The user will need to get ready for a new tank of LPG.

Figure 6:
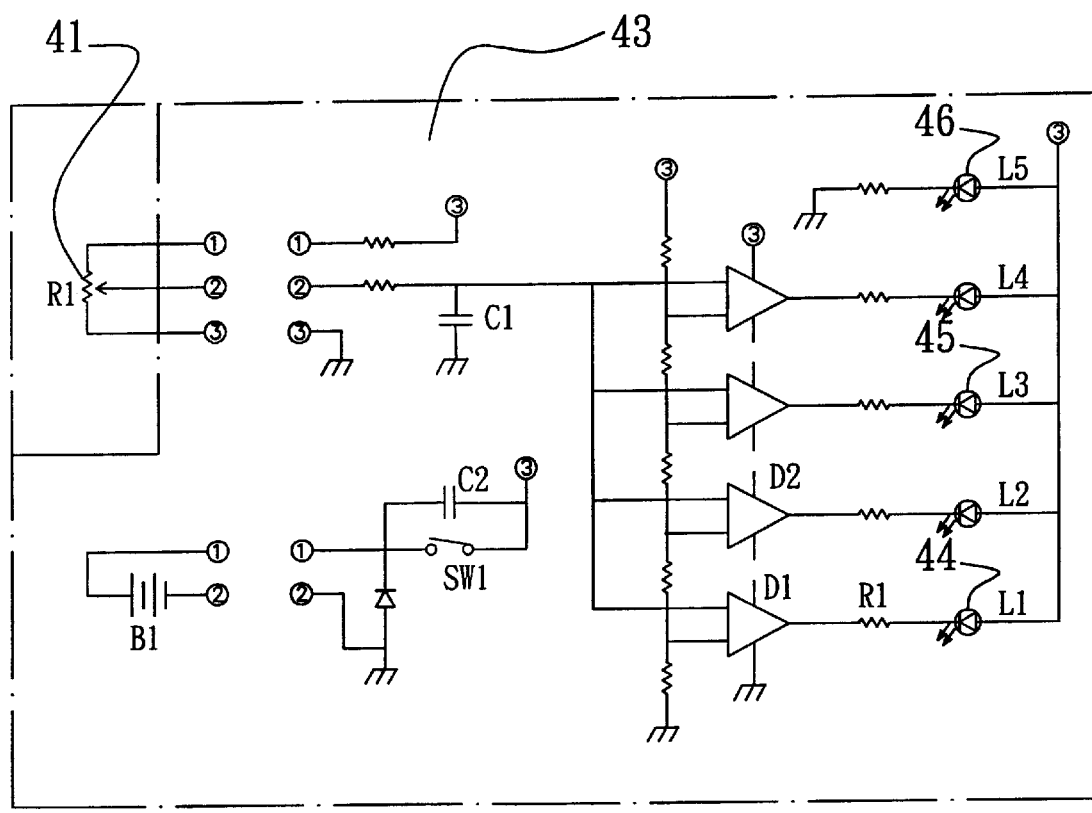
FIG. 6 is the circuit diagram of the measuring device of the suspension support with volume indication for LPG in accordance with the present invention.

In accordance with the present invention, if the measuring device 4 is an electronic device, then the circuit is shown in FIG. 6. In the present preferred embodiment, direct-dialing variable resistance R1 is used as the sensing section 41 of the measuring device 4. Various colors of diodes L1, L2, L3, L4, L5 are used as the indicators 44, 45, 46 and at an appropriate position on the circuit, digital comparators D1, D2, resistance R2, R3 and a power source B1, capacitors C1, C2 and a main switch SW1 are mounted. Due to the modulation of the variable resistance, the various colored diode L1, L2, L3, L4, L5 are lighted as to distinguish the amount of LPG in the LPG tank.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A suspension support with volume indication for a LPG tank comprising a slidable upright pole, a securing rail having an opening as a sliding path, a retractable restoring device, a plurality of suspension hooks and a measuring device with a display capable of showing level indication, characterized in that the securing rail is mounted at one end of the slidable upright pole and the restoring device connected the securing rail with the slidable upright pole at one end within the sliding path, the sensing section of the measuring device is mounted between the slidable upright pole and the sliding path, remote away from the restoring device, such that the sensing section produces a triggering action due to the weight between the securing rail and the slidable upright pole, and signal of level number is transmitted to the display of the measuring device to provide an indication, and the suspension hooks a remounted to one end face of the slidable upright pole to suspend at a lug on the LPG tank and the bottom of the LPG tank.

2. The suspension support with volume indication for a LPG tank as set forth in claim 1, wherein the retractable restoring device is an elastic body formed from a plurality of spring coils together with a plurality of positioning pegs and a plurality of sleeves.

3. The suspension support with volume indication for a LPG tank as set forth in claim 1, wherein the retractable restoring device is an elastic body of a spring absorber together with a plurality of positioning pegs and a plurality of sleeves.

4. The suspension support with volume indication for a LPG tank as set forth in claims 2 or 3, wherein the retractable restoring device and the sensing section of the measuring device are mounted within a cavity formed at one side of the slidable upright pole mounting the securing rail.

5. The suspension support with volume indication for a LPG tank as set forth in claim 4, wherein the restoring end of the retractable restoring device passes through the lateral face of the slidable upright pole and is connected to the securing rail, and the other end of the retractable restoring device is connected to the inner wall of the slidable upright pole.

6. The suspension support with volume indication for a LPG tank as set forth in claim 5, wherein a first pair of long slots are provided to the lateral wall of the fixing rail element corresponding to the top end lug of the elastic body and a second pair of long slots are to the lateral wall of the fixing rail elements corresponding to the lower end lug of the elastic body, and a pair of mounting holes are provided across the second pair of the long slots, and the slot hole of the first and the second slot and the mounting hole are slightly larger than the peg body of the positioning peg but smaller than the head portion of the positioning peg such but such that one end locked the positioning peg passes through the shaft mount, upper end lug, the first pair long slot, and the other end locked the positioning peg passes through the through hole, lower end lug, the second pair long slot, forming into elastic body, which is connected to the sliding upright pillar, and the fixing rail element.

7. The suspension support with volume indication for a LPG tank as set forth in claim 1, wherein the measuring device includes a sensing section, at least a transmission wire and a display.

8. The suspension support with volume indication for a LPG tank as set forth in claim 7, wherein the sensing section is a direct-dialing multi-stages switch.

9. The suspension support with volume indication for a LPG tank as set forth in claim 7, wherein the sensing section is a direct-dialing multi-stages variable resistance.

10. The suspension support with volume indication for a LPG tank as set forth in claims 8 or 9, wherein the transmission wire circuit includes a plurality of wires, and the other end of the wire connecting the sensing section, is connected to an electronic signaled display having a plurality of level numbers indicators.

11. The suspension support with volume indication for a LPG tank as set forth in claim 1, wherein the sensing section is an elastic oil sac filled with liquid, ad connected to a transmission line constituted from a pressure conduit, and connected to a display constituted from pressure gauze.

12. The suspension support with volume indication for a LPG tank as set forth in claims 1 or 7, wherein the cavity and the sliding path are provided with engaging fasteners to fasten the securing end of the sensing section and the triggering end.

13. The suspension support with volume indication for a LPG tank as set forth in claim 4, wherein the other end of the cavity contains the restoring device which is provided with rollers, allowing rolling along the lateral wall of an oven.

* * * * *